(12) United States Patent
Aoki (10) Patent No.: US 11,256,162 B2
(45) Date of Patent: Feb. 22, 2022

(54) OPERATION APPARATUS, LENS APPARATUS, AND IMAGE PICKUP APPARATUS

(71) Applicant: CANON KABUSHIKI KAISHA, Tokyo (JP)

(72) Inventor: Katsuhisa Aoki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 337 days.

(21) Appl. No.: 16/148,797

(22) Filed: Oct. 1, 2018

(65) Prior Publication Data

US 2019/0107768 A1 Apr. 11, 2019

(30) Foreign Application Priority Data

Oct. 6, 2017 (JP) .............................. JP2017-196421

(51) Int. Cl.
*G03B 17/18* (2021.01)
*G02B 7/04* (2021.01)
*H04N 5/225* (2006.01)
*H04N 5/232* (2006.01)

(52) U.S. Cl.
CPC .............. *G03B 17/18* (2013.01); *G02B 7/04* (2013.01); *H04N 5/2251* (2013.01); *H04N 5/23203* (2013.01)

(58) Field of Classification Search
CPC .......... H04N 5/23212; H04N 5/23296; H04N 5/23203; H04N 5/2251; G03B 17/18; G02B 7/04
See application file for complete search history.

(56) References Cited

U.S. PATENT DOCUMENTS

| 5,633,680 | A | * | 5/1997 | Kaneko | .................... G02B 7/08 348/357 |
| 6,522,838 | B1 | * | 2/2003 | Natsume | ................. G02B 7/102 348/211.99 |
| 7,689,112 | B2 | * | 3/2010 | Sasaki | ................ H04N 5/23212 396/147 |
| 7,742,247 | B2 | * | 6/2010 | Terashima | ......... H04N 5/23296 359/819 |
| 8,023,036 | B2 | * | 9/2011 | Sasaki | .............. H04N 5/232127 348/345 |
| 2006/0023110 | A1 | * | 2/2006 | Sasaki | ................ H04N 5/23212 348/349 |

(Continued)

FOREIGN PATENT DOCUMENTS

| JP | H06-069946 U | 9/1994 |
| JP | H07-162725 A | 6/1995 |

(Continued)

OTHER PUBLICATIONS

Yokoyama, Satomi; "Translation of JP2011-109324 A"; Jun. 2011 (Year: 2011).*

*Primary Examiner* — John Villecco
(74) *Attorney, Agent, or Firm* — Canon U.S.A., Inc. IP Division (57) ABSTRACT

An operation apparatus for remotely operating a lens apparatus includes an operation member that rotates, a holder that holds the operation member, and a display supported by the holder, wherein the display displays information where an upward orientation of the displayed information is towards the operation member.

9 Claims, 6 Drawing Sheets

(56) References Cited

U.S. PATENT DOCUMENTS

| | | | | |
|---|---|---|---|---|
| 2007/0098390 A1* | 5/2007 | Sasaki | ............... | H04N 5/23212 |
| | | | | 396/147 |
| 2007/0166027 A1* | 7/2007 | Misawa | ................ | G03B 17/02 |
| | | | | 396/529 |
| 2007/0212051 A1* | 9/2007 | Moriya | ................. | G03B 17/18 |
| | | | | 396/147 |
| 2012/0176508 A1* | 7/2012 | Jeong | .................... | H04N 5/772 |
| | | | | 348/231.2 |
| 2013/0121673 A1* | 5/2013 | Natsume | ............... | H04N 5/232 |
| | | | | 396/56 |
| 2015/0294146 A1* | 10/2015 | Ogara | ............... | H04N 5/23293 |
| | | | | 348/333.06 |
| 2019/0109978 A1* | 4/2019 | Yokozeki | .......... | H04N 5/23212 |

FOREIGN PATENT DOCUMENTS

| | | | |
|---|---|---|---|
| JP | H10-098635 A | | 4/1998 |
| JP | 2000098216 A | * | 4/2000 |
| JP | 2001-160912 A | | 6/2001 |
| JP | 2004-274475 A | | 9/2004 |
| JP | 2006-049952 A | | 2/2006 |
| JP | 2006-79054 A | | 3/2006 |
| JP | 2008-064927 A | | 3/2008 |
| JP | 2008-187226 A | | 8/2008 |
| JP | 2011-109324 A | | 6/2011 |
| JP | 2016-212352 A | | 12/2016 |
| JP | 2019179205 A | * | 10/2019 |

\* cited by examiner

OPERATION APPARATUS, LENS APPARATUS, AND IMAGE PICKUP APPARATUS

BACKGROUND

Field

The present disclosure relates to an operation apparatus, a lens apparatus, and an image pickup apparatus.

Description of the Related Art

Conventionally, a lens operation apparatus referred to as a focus demand that executes focus operation of a lens apparatus, such as a television lens, has been known. The lens operation apparatus includes a knob manually and rotationally operated by a photographer or a camera person. A driving apparatus, such as a motor, is controlled based on a rotation angle of the knob, so that a position of a focus lens group (a lens apparatus) is controlled thereby. The lens operation apparatus includes switches in addition to the knob.

A lens operation apparatus discussed in Japanese Patent Application Laid-Open No. 2001-160912 enables a photographer to previously set a desired zoom position (shot position) and to display a shot function (preset function) for automatically reproducing the shot position through operation of switches, so that the photographer can easily grasp the shot position. Japanese Patent Application Laid-Open No. 2006-79054 discusses a lens operation apparatus that can be easily operated by a photographer with a configuration in which a cross key for specifying a focal point (auto-focus frame) and a focus ring for executing auto-focusing are arranged adjacent to each other.

The lens operation apparatus can be operated with a right hand or a left hand according to a dominant hand or a favor of a photographer who uses a lens apparatus. When the lens operation apparatus is operated with a left hand, the lens operation apparatus is attached on a side of the left hand of the photographer in a state where a knob faces outward. However, in the conventional technique described in Japanese Patent Application Laid-Open No. 2001-160912, a case that the photographer uses the lens operation apparatus with the left hand is not taken into consideration.

Information, such as letters and a light-emitting diode (LED) lighting position, printed on a housing of the lens operation apparatus described in Japanese Patent Application Laid-Open No. 2001-160912 can be easily read when the lens operation apparatus is attached to the right-hand side. Accordingly, if the lens operation apparatus is attached to the left-hand side, information such as the letters cannot be read easily because orientations thereof are inverted and turned upside down. While the switches are asymmetrically arrayed in the vertical direction, an array of the switches is also inverted based on whether the lens operation apparatus is operated on the left-hand side or the right-hand side. Therefore, a switch having a function different from an intended function may be operated.

In the lens operation apparatus described in Japanese Patent Application Laid-Open No. 2006-79054, both of the above-described cross key and the switch for enabling auto-focusing are arranged on a same curvilinear surface of the housing in a vicinity of the operation knob. Accordingly; there is a risk that the photographer can unintentionally touch the switch to cause erroneous operation.

SUMMARY

The disclosure provides, for example, an operation apparatus advantageous in use thereof with a user's right or left hand.

The disclosure provides an operation apparatus for remotely operating a lens apparatus. The operation apparatus includes an operation member that rotates, a holder that holds the operation member, and a display supported by the holder, wherein the display displays information where an upward orientation of the displayed information is towards the operation member.

Further features will become apparent from the following description of exemplary embodiments with reference to the attached drawings.

DESCRIPTION OF THE EMBODIMENTS

Hereinafter, exemplary embodiments will be described in detail with reference to the appended drawings.

First, a lens operation apparatus according to a first exemplary embodiment will be described with reference to FIGS. 1 to 3, FIGS. 4A, 4B, 5A, and 5B.

Figure 1:
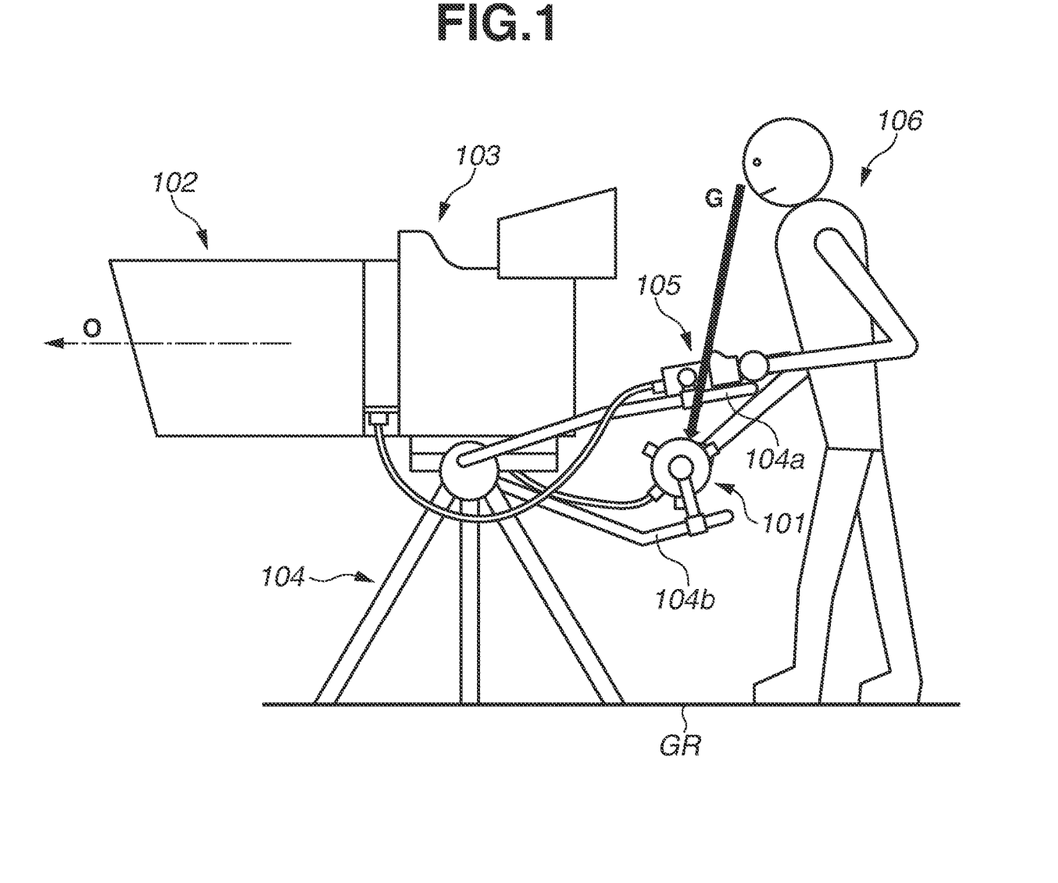
FIG. 1 is a diagram illustrating a state in which an imaging apparatus including an operation apparatus according to the present disclosure is being used.

FIG. 1 is a diagram illustrating a state in which an imaging apparatus or image pickup apparatus is being used. The imaging apparatus includes a system that includes a lens operation apparatus and a lens apparatus.

A lens apparatus 102 is attached to a camera 103. The camera 103 includes an image pickup element (not illustrated), and the lens apparatus 102 forms an object image on the image pickup element. The lens apparatus 102 includes a lens and a driving unit for driving the lens in a direction of an optical axis O.

The camera 103 is held by a tripod stand 104 placed on a ground GR. A focus demand 101 as a lens operation apparatus for executing focus operation of the lens apparatus 102 and a zoom demand 105 as a lens operation apparatus for executing zoom operation thereof are fixed to the tripod stand 104. These two lens operation apparatuses are connected to the lens apparatus 102.

By operating the two lens operation apparatuses, a photographer 106 can remotely execute imaging operation while making a desired adjustment on a focal point and a field of view from a remote position/place from the lens apparatus 102. Specifically, a control unit of the lens operation apparatus transmits an instruction signal based on an operation amount to a driving unit of the lens apparatus 102, so that the driving unit drives the lens based on the instruction signal. A line-of-sight of the photographer 106 who is operating the focus demand 101 is indicated by an arrow G.

<Definition of Orientation Used in Description>

Hereinafter, an orientation relating to the focus demand 101 will be expressed based on a condition in which the photographer 106 executes imaging by using the lens apparatus 102 in a state where the focus demand 101 is arranged at a position between the photographer 106 and the lens apparatus 102 as illustrated in FIG. 1. Specifically, with respect to the orientation relating to the focus demand 101, one side of the focus demand 101 in a direction of the optical axis O, on which the photographer 106 is present, is referred to as "photographer side". Another side in the direction of the optical axis O, on which the object is present, is referred to as "lens apparatus side".

<Configuration>

Figure 2:
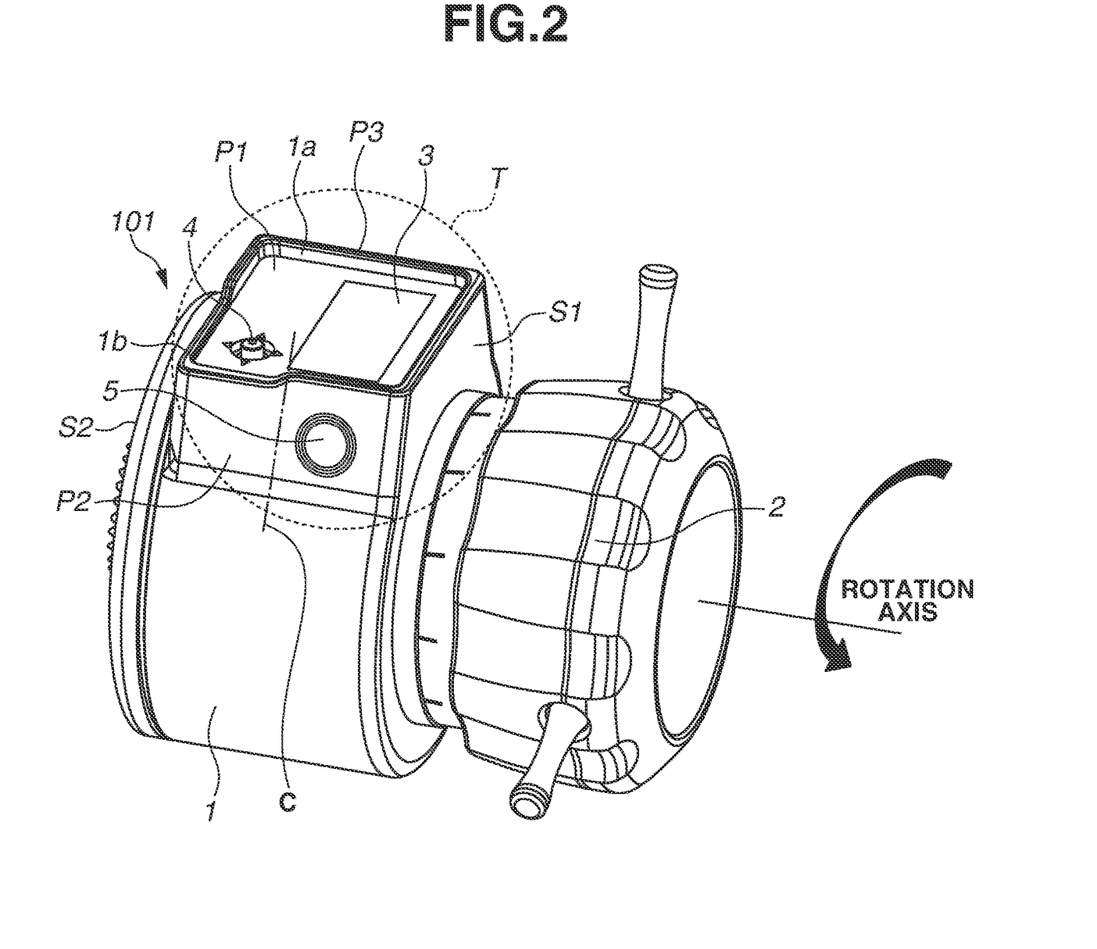
FIG. 2 is a diagram illustrating an operation apparatus according to a first exemplary embodiment.

FIG. 2 is a diagram illustrating a perspective view of the focus demand 101.

A knob (operation member) 2 is relatively and rotatably held by a housing 1 (holder). The photographer 106 can execute focus adjustment of the lens apparatus 102 by rotationally operating or rotating the knob 2. In other words, when the photographer 106 grasps and rotates the knob 2, an instruction value based on a rotation angle of the knob 2 is transmitted (output) to the control unit of the lens apparatus 102. A focus lens (not illustrated) of the lens apparatus 102 is driven based on the instruction value° ha addition, the instruction value can be the operation amount (rotation angle) itself of the knob 2. As described above, while the focus demand 101 controls the lens apparatus 102 by transmitting a control signal to the control unit of the lens apparatus 102, the control unit can be included in the focus demand 101.

<Housing>

The housing 1 is formed in a substantially cylindrical shape with an axis the same as a rotation axis of the knob 2, and supports a display 3, a cross key (instruction device or unit) 4, and a switch 5. An attachment portion of the housing 1 with an attachment surface S2 is attached to either of the arm portions 104a and 104b extending from the tripod stand 104 (see FIG. 1).

<Convex Portion>

As illustrated in FIG. 2, a convex portion T surrounded by a dashed line in FIG. 2, which is projected toward the outer side in a diameter direction with respect to the rotation axis of the knob 2, is formed on the housing 1. A display 3 and a cross key 4 described below are arranged on an upper surface P1 of the convex portion T (i.e., a first surface that is to be an upper surface in a vertical direction when the focus demand 101 is attached). In the present exemplary embodiment, the upper surface P1 is a surface parallel to the rotation axis of the knob 2. In addition, the upper surface P1 does not have to be strictly parallel to the rotation axis, but can be substantially parallel to the rotation axis.

<Peripheral Structure of Surface P1>

The display 3 displays information about the lens operation apparatus, e.g., information about a function set to the lens operation apparatus, via an item such as a character, a numeral, a symbol, or a graphic (or a combination of items), which represents the current function of the focus demand 101. The information is displayed where an upward orientation of the displayed information is towards the operation member and where a downward orientation of the displayed information is towards a side opposite to the operation member with respect to the display.

A protection wall 1a for protecting the display 3 and the cross key 4 is formed on an outer edge portion of the surface P1 on which the display 3 and the cross key 4 are arranged. While the protection wall 1 a is arranged to surround the outer edge of the surface P1, a cutout portion 1b is formed in a part of the protection wall 1a in a peripheral area of the cross key 4 (the wall is not in an area in a periphery of the instruction device) in order not to interrupt the photographer 106 who is operating the cross key 4.

<Switch>

Each of the switches 5 is arranged on each of side surfaces P2 and P3 of the convex portion T formed on the housing 1 (i..e., the two second surfaces in a circumferential direction with respect to the rotation axis of the knob 2), at a position in a vicinity of the knob 2 (on a side of the knob 2 with respect to a central line C of the surface P2 or P3 in the rotation axis direction). In other words, each of the switches 5 is arranged on the surface intersecting with the surface on which the display 3 and the cross key 4 are arranged. Accordingly, at least a part of the protection wall 1 a is provided in an area between each of the switches 5 and the upper surface P1.

<Functions of Respective Units>

The photographer 106 can select a function of the focus demand 101 by operating the cross key 4. A function currently set thereto is displayed on the display 3. The photographer 106 can switch ON and OFF (enable and disable states) of the selected function by pressing the switch 5.

<Attachment of Lens Operation Apparatus>

In order to enable the photographer 106 to easily operate the focus demand 101 with either the photographer's 106 right hand or left hand, the focus demand 101 according to the present exemplary embodiment can be attached to the right side or the left side of the lens apparatus 102 with respect to the optical axis O when the lens apparatus 102 is viewed from the photographer 106. Specifically, as illustrated in FIG. 1, the focus demand 101 is attached to either of the arm portions 104a and 104b extending from the tripod stand 104. The zoom demand 105 is attached to the other arm portions 104a and 104b.

The focus demand 101 is attached such that the convex portion T is projected in a direction opposite to a direction to the ground GR of the lens apparatus 102, i.e., the surface Pi faces upward in a vertical direction (see FIG. 1).

Figure 3:
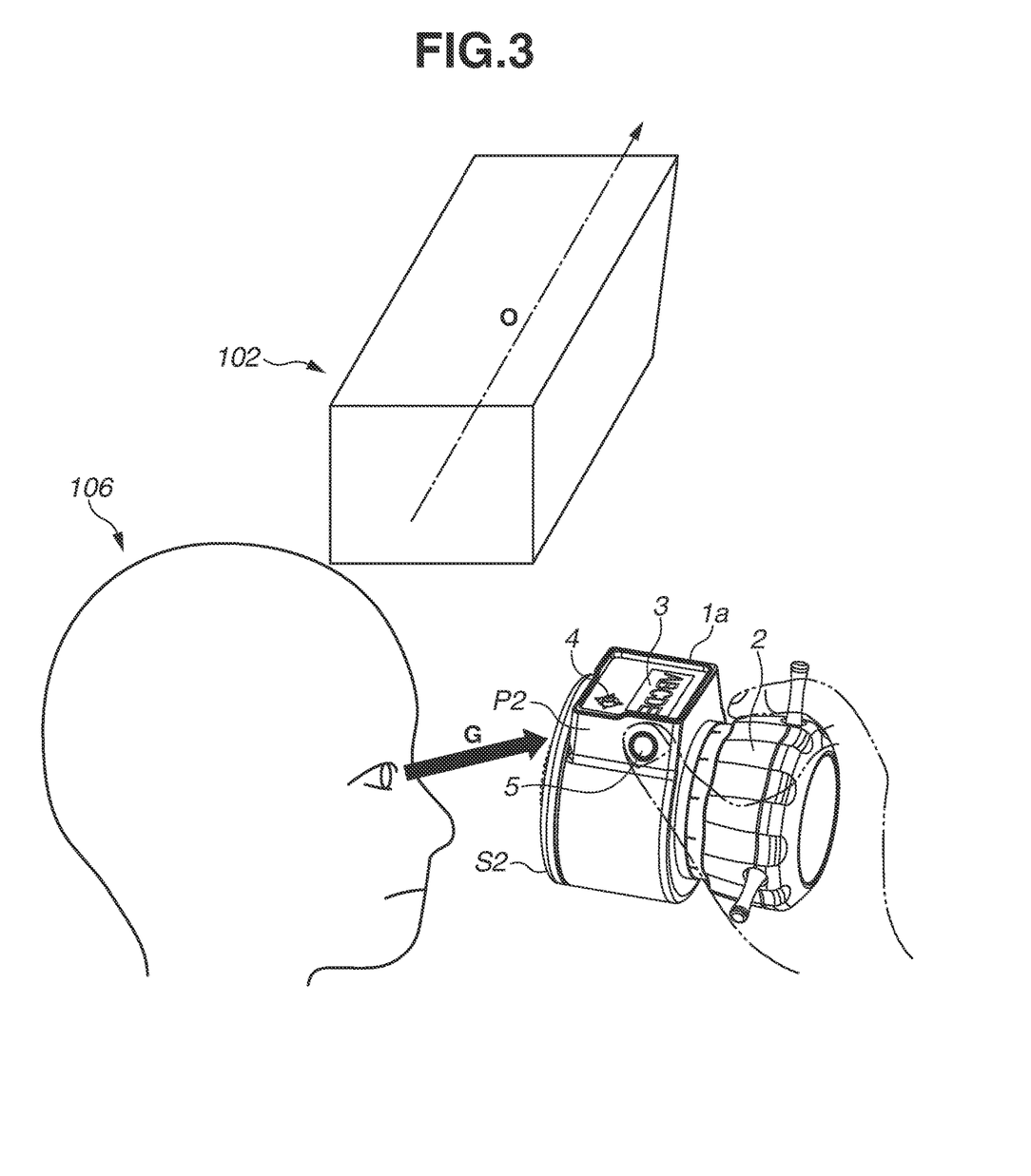
FIG. 3 is a diagram illustrating in detail a state in which the operation apparatus according to the first exemplary embodiment is being used.

FIG. 3 is a diagram illustrating a state where the focus demand 101 is attached to the right side (right-hand side). The focus demand 101 is attached such that the attachment surface S2 is parallel to the optical axis O to face the optical axis O of the lens apparatus 102 (i.e., an inner side in a diameter direction), and the knob 2 faces a side on which the optical axis O is not provided (i.e., an outerside in a diameter direction).

With this configuration, because the photographer 106 generally operates the knob 2 from the outer side in the diameter direction of the optical axis O, the focus demand 101 can easily be operated.

Figure 4A:
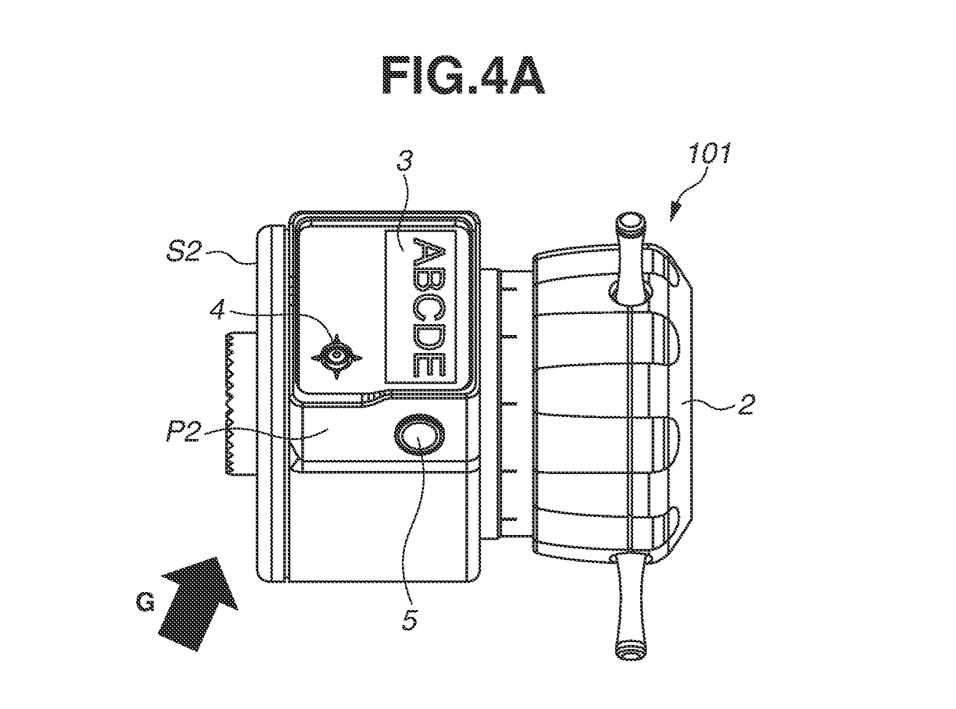
FIGS. 4A and 4B are diagrams illustrating how a display of the operation apparatus according to the first exemplary embodiment is viewed.
Figure 4B:
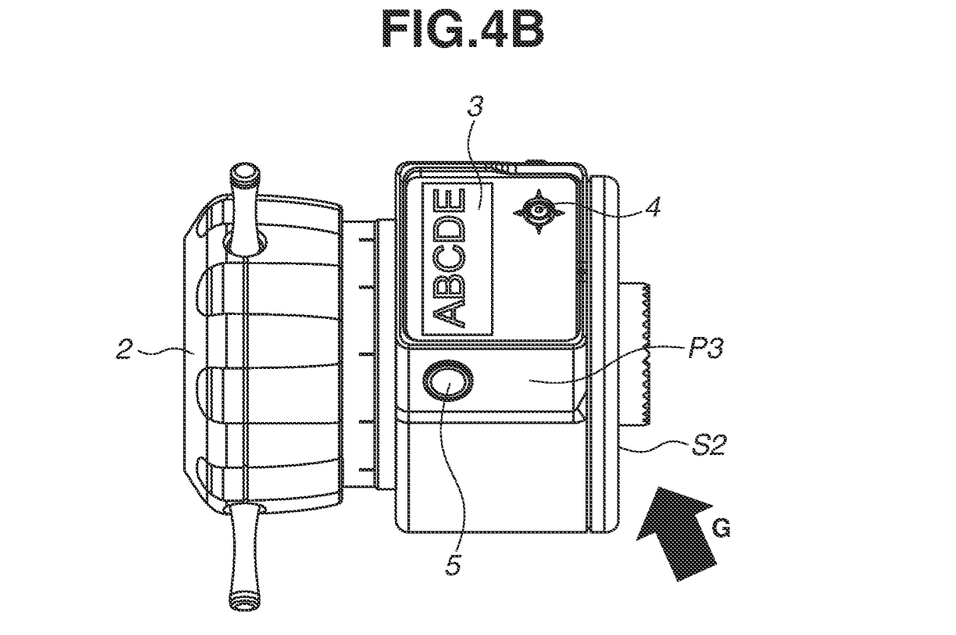

FIG. 4A is a diagram illustrating the focus demand 101 attached to the right side (right-hand side), and. FIG. 4B is a diagram illustrating the focus demand 101 attached to the left side (left-hand side). When the focus demand 101 is attached to the left-hand side opposite to the side illustrated in FIG. 3, the focus demand 101 is attached such that the convex portion T is projected in a direction opposite to a direction to the ground GR of the lens apparatus 102 (see FIG. 1). Similarly, the attachment surface S2 faces the optical axis O of the lens apparatus 102 (i.e., an inner side in a diameter direction), and the knob 2 faces a side on which the optical axis O is not provided (i.e., an outer side in a diameter direction). The attachment state in FIG. 49 is different from the attachment state illustrated in FIG. 3 or 4A in that the focus demand 101 is attached such that the side surface P3 faces the photographer 106.

<Effect>

The photographer 106 faces the right-hand side to view the display 3 with a line of sight such that the photographer 106 looks down at the display 3 as indicated by the arrow G illustrated in FIG. 4A or 49 (also see FIGS. 1 and 3) while operating the knob 2.

At this time, in either of the orientations illustrated in FIGS. 4A and 4113, the display 3 displays the information expressed by a character, a numeral, a symbol, or a graphic with such an orientation that a top of the information is displayed on a side close to the knob 2 and a bottom of the information is displayed on a side close to the attachment surface S2.

The photographer 106 can instantaneously and easily view or read the information in either of the orientations illustrated in FIGS. 4A and 49 because an item such as a character, a numeral, a symbol, or a graphic is displayed with such an orientation that the item is not inverted with respect to (the line of sight indicated by the arrow G of) the photographer 106. Hereinafter, this orientation is referred to as an orientation with which an item faces the photographer 106. In a case where a graphic is to be displayed with such an orientation that the graphic faces the photographer 106, this orientation has to be the orientation intended by the photographer 106.

Because the information displayed on the display 3 faces the photographer 106, the photographer 106 can instantaneously recognize the function currently allocated to the switch 5, and erroneous operation caused by an unrecognizable display can be prevented.

<The Other Effects>

Because the switch 5 is arranged at a position close to the knob 2 on the surface P2, the photographer 106 can press the switch 5 with the photographer's 106 thumb while grasping and operating the knob 2. Accordingly, the photographer 106 can promptly switch the functions while continuously executing imaging operation.

As described above, the cross key 4 and the display 3 are arranged on the upper surface P1 of the convex portion T different from the surface (side surface P2 or P3) on which the switch 5 is arranged. The protection wall 1a is arranged in at least a part of an area between the upper surface P1 and the side surface P2 (P3).

With this configuration, when the photographer 106 operates the switch 5 arranged on the surface P2 with the photographer's 106 thumb, a possibility that the photographer 106 unintentionally touches the cross key 4 can be reduced.

Because the display 3 and the cross key 4 are arranged on the same upper surface P1, the photographer 106 can intuitively operate the cross key 4 while looking at the display 3 when the photographer 106 is operating the cross key 4. More specifically, the photographer 106 can operate the cross key 4 more intuitively because the photographer 106 can simultaneously view the movement of the photographer's 106 finger that is operating the cross key 4 and change of information displayed on the display 3.

Figure 5A:
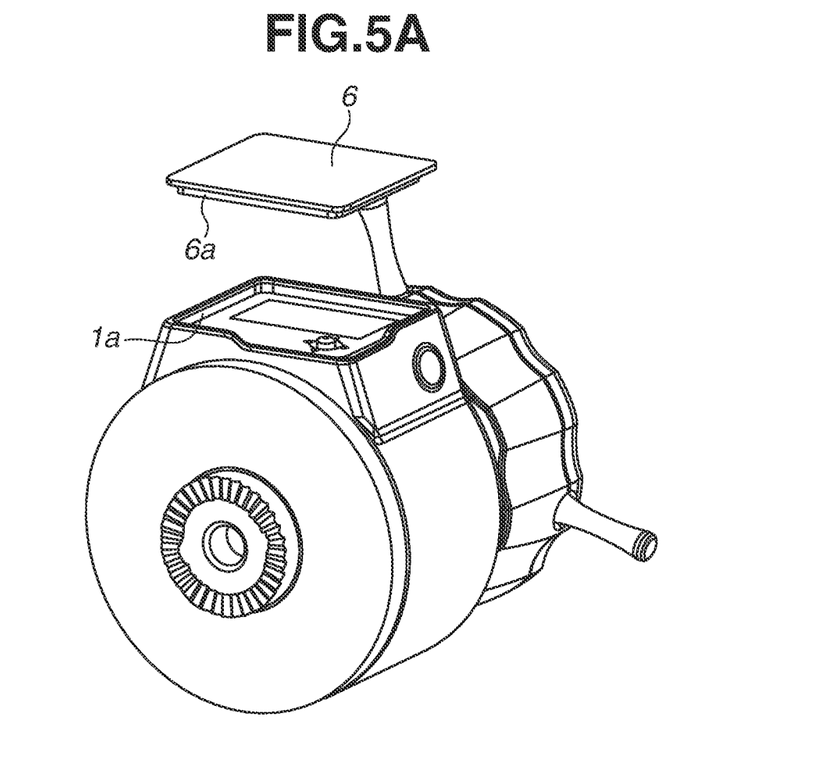
FIGS. 5A and 5B are diagrams illustrating a method of attaching a protection cover of the operation apparatus according to the first exemplary embodiment.
Figure 5B:
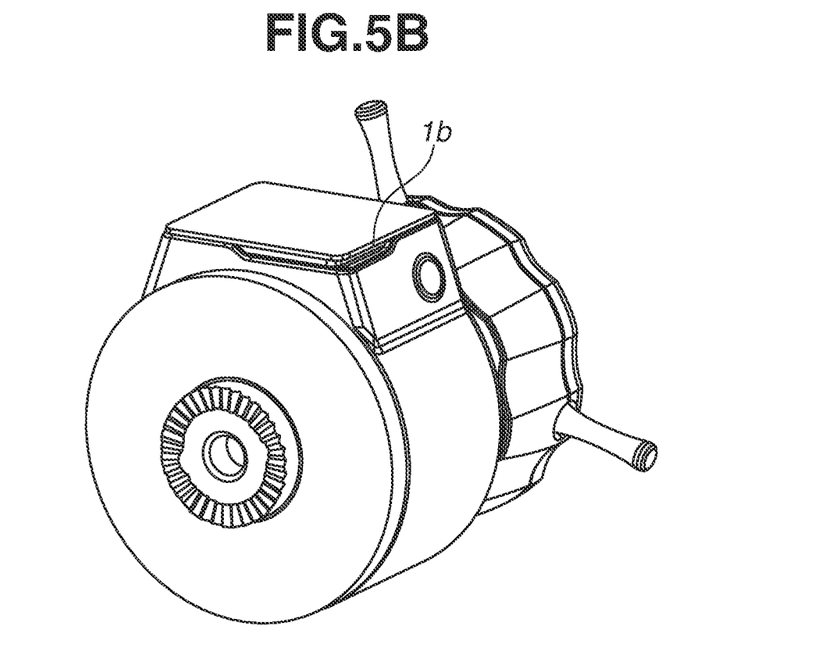

FIGS. 5A and 5B are diagrams illustrating a method of attaching a protection cover of the operation apparatus according to the first exemplary embodiment. A protection cover (protection cap) 6 attached to the display 3 of the focus demand 101 will be described with reference to FIGS. 5A and 5B.

In the present exemplary embodiment, the protection wall 1a also includes a function of a fitting hole. The protection cover 6 includes a convex portion 6a, and the convex portion 6a fits into the protection wall 1a (the over fits into the wall to be attached to the wall). With this configuration, the protection cover 6 is held by the housing 1, so that the display 3 is protected by the protection cover 6.

When the protection cover 6 is to be detached, the photographer 106 can easily detach the protection cover 6 by inserting the photographer's 106 finger into a cutout portion 1b and hooking the protection cover 6 with the photographer's 106 finger. In other words, when the protection cover 6 is to be detached, the cutout portion 1b functions as a relief shape for hooking the protection cover 6 with the photographer's 106 finger.

In addition, the protection wall 1a can serve as a fitting hole into which the protection cover 6 fits on an inner side of the protection wall 1a, or the protection wall 1a can serve as a fitting shaft into which the protection cover 6 fits on an outer side of the protection wall 1a. In the present exemplary embodiment, a part of the protection wall 1a that surrounds the upper surface P1 of the convex portion T forms the cutout portion. 1b in a periphery of the cross key 4. However, an effect of detachably attaching the protection cover 6 can be acquired even if the entire circumference thereof is surrounded by the protection wall 1a.

Hereinafter, a lens operation apparatus according to a second exemplary embodiment of the present invention will be described with reference to FIGS. 6A and 6B. Description of a configuration or a function similar to that of the first exemplary embodiment will be omitted.

<Configuration>

Figure 6A:
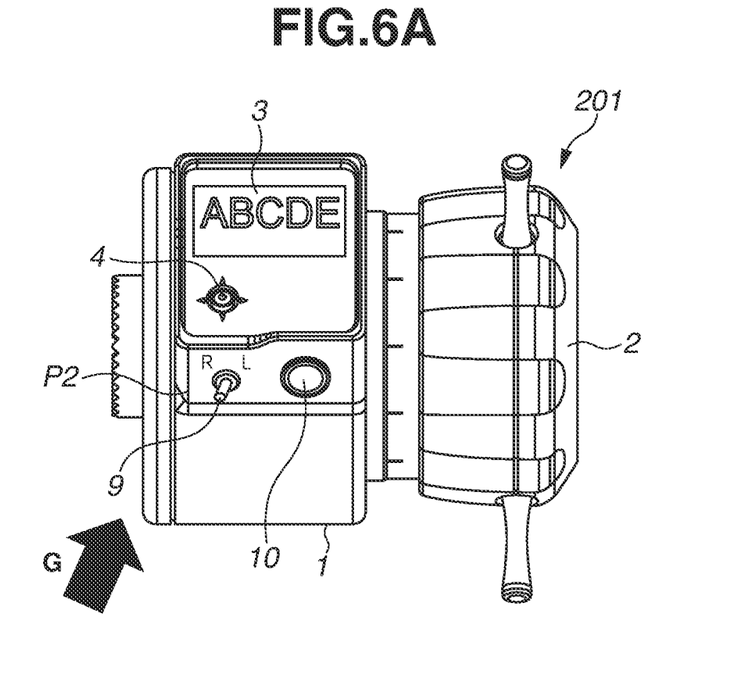
FIGS. 6A and 6B are diagrams illustrating an operation apparatus according to a second exemplary embodiment.
Figure 6B:
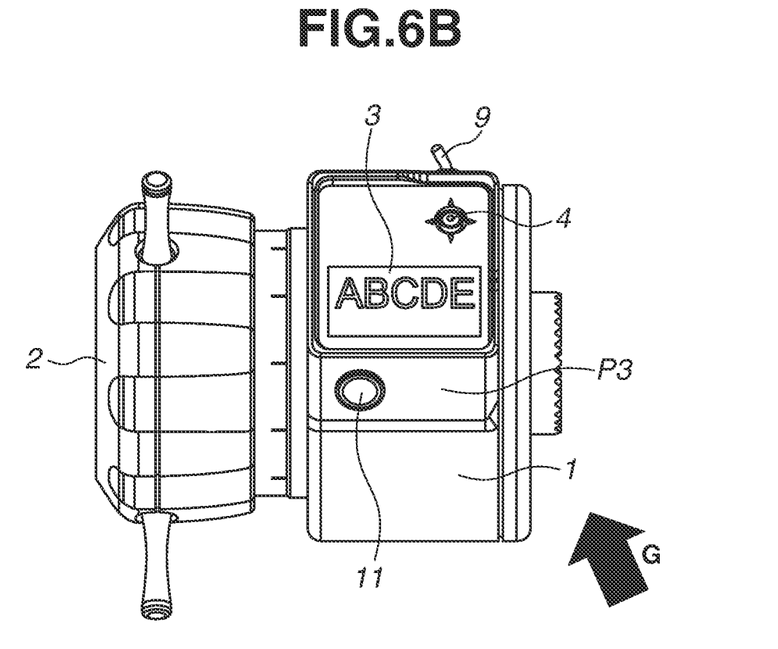

FIGS. 6A and 6B are diagrams illustrating a focus demand 201 of the present exemplary embodiment. FIGS. 6A and 6B are diagrams illustrating the focus demand 201 viewed from the photographer 106 when the photographer 106 is operating the focus demand 201 on the right-hand side and the left-hand side, respectively. In addition, definitions of the right-hand side and the left-hand side are similar to those described in the first exemplary embodiment. In other words, in a case where the focus demand 201 is operated on the right-hand side, the focus demand 201 is attached to tripod stand 104 or the lens apparatus 102 on the right side with respect to the optical axis O when viewed from the photographer 106 who is operating the lens apparatus 102 (see FIG. 1). In a case where the focus demand 201 is operated on the left-hand side, the focus demand 201 is attached to tripod stand 104 or the lens apparatus 102 on the left side with respect to the optical axis O.

The focus demand 201 of the present exemplary embodiment includes a switching lever (switch, or switching device or unit) 9 arranged on the surface P2 of the housing 1. As illustrated in FIG. 6A, the switching lever 9 is inclined in the R-direction when the photographer attaches the focus demand 201 on the right-hand side to use the focus demand 201 with the photographer's 106 right hand. Alternatively, as illustrated in FIG. 6B, the switching lever 9 is inclined in the L-direction when the photographer attaches the focus demand 201 on the left-hand side to use the focus demand 201 with the photographer's 106 left hand. The switch is configured to input which of a right side and a left side with respect to an optical axis of the lens apparatus the operation apparatus is attached to.

Similar to the first exemplary embodiment, a switch 10 and a switch 11 are arranged on the side surface P2 and the side surface P3, respectively, of the convex portion of the housing 1. The same reference numerals are applied to the configurations similar to those of the first exemplary embodiment, and descriptions thereof will be omitted.

<In a case where Focus Demand is Attached to Right-Hand Side>

First, the focus demand 201 attached to the right-hand side will be described.

As illustrated in FIG. 6A, when the switching lever 9 is inclined in the R-direction, a character, a numeral, a symbol, or a graphic is displayed on the display 3 with such an orientation that a bottom of the character, the numeral, the symbol, or the graphic is displayed on a side close to the photographer 106 (i.e., a top of the character, the numeral, the symbol, or the graphic is displayed on a side close to the lens apparatus 102) in the optical axis direction.

At the same time, an orientation indicated by the cross key 4 corresponds to an orientation with which the information is displayed on the display 3 (i.e., one orientation indicated by one part of the cross key 4 on a side of the display 3 corresponds to the upward orientation, whereas another orientation indicated by another part of the cross key 4 on a side of the knob 2 corresponds to the rightward orientation).

The switch 10 arranged on the side surface P2 of the convex portion is enabled, and at the same time, the switch 11 arranged on the side surface P3 of the convex portion is disabled.

<In a case where Focus Demand is Attached to Left-Hand Side>

The focus demand 201 attached to the left-hand side will be described.

As illustrated in FIG. 6B, the switching lever 9 is inclined in the L-direction when the focus demand 201 is used with the photographer's 106 left hand.

When the switching lever 9 is inclined in the L-direction, an orientation of a character, a numeral, a symbol, or a graphic displayed on the display 3 is switched to an orientation with which a bottom of the character, the numeral, the symbol, or the graphic is displayed on a side close to the photographer 106 (i.e., a top of the character, the numeral, the symbol, or the graphic is displayed on a side close to the lens apparatus 102) in a direction of the optical axis O of the lens apparatus 102. At the same time, an orientation indicated by the cross key 4 corresponds to a display orientation of the display 3 (i.e., one orientation indicated by one part of the cross key 4 on a side of the display 3 corresponds to the downward orientation, whereas another orientation indicated by another part of the cross key 4 on a side of the knob 2 corresponds to the leftward orientation).

The switch 11 arranged on the side surface P3 of the convex portion is switched to an enable state, and the switch 10 arranged on the side surface P2 of the convex portion is switched to a disable state.

<Effect>

In the focus demand 201, an orientation of a character, a numeral, a symbol, or a graphic displayed on the display 3, orientations indicated by the cross key 4, and enable/disable states of the switches 10 and 11 are collectively and simultaneously switched through a single operation of the switching lever 9.

As described above, in the present exemplary embodiment, a plurality of settings necessary to be switched can be collectively and easily switched based on whether the focus demand 201 is attached to the right side or the left side of the lens apparatus 102 with respect to the optical axis O.

An item such as a character, a numeral, a symbol, or a graphic is displayed on the display 3 with such an orientation that the photographer 106 can always view (read) the item easily. At the same time, because directions in which the photographer 106 moves the photographer's 106 finger to operate the cross key 4 conform to respective directions of the cross key 4 tier changing the information displayed on the display 3, the photographer 106 can continuously perform intuitive operation. For example, orientations of all of the information displayed on the display 3 can be inverted, or an orientation of only some of the items (i.e., information) that are not symmetric (rotationally symmetric) can be changed.

When the focus demand 201 is attached to the right-hand side, the switch 10 touched with the photographer's 106 thumb is enabled, and the switch 11 touched with another of the photographer's 106 fingers is disabled. With this configuration, in a case where the photographer 106, for example, unintentionally touches the switch 11 with the photographer's 106 forefinger, erroneous operation of a function allocated to the switch 11 can be prevented.

When the focus demand 201 is attached to the left-hand side, the switch 11 that can be touched with the photographer's 106 thumb is switched to an enable state, and the switch 10 that can be touched with another of the photographer's 106 fingers is switched to a disable state. With this configuration, in a case where the photographer 106, for example, unintentionally touches the switch 10 with another of the photographer's 106 fingers, erroneous operation of a function allocated to the switch 10 can be prevented.

A switch different from a switch enabled in the present disclosure can be enabled in this case, only the switch 11 is enabled when the focus demand 201 is attached to the right side, and only the switch 10 is enabled when the focus demand 201 is attached to the left side in the above case, it is preferable that each of the switches 10 and 11 be operated with the photographer's 106 forefinger instead of the photographer's 106 thumb.

Different functions can be allocated to the switches 10 and 11, and the functions set thereto can be switched and exchanged by the switching lever 9. With this configuration, the photographer 106 can perform operation without having a sense of discomfort regardless of whether the focus demand 201 is attached to the right side or the left side.

While the exemplary embodiment in which the switching lever 9 collectively and concurrently switches three settings has been described, settings other than the three settings can be simultaneously switched. For example, a rotation direction of the knob 2 (i.e., clockwise rotation or counterclockwise rotation of the knob 2 with respect to the rotation axis) and an instruction signal corresponding to the rotation direction can be switched together with the functions described in the above exemplary embodiment. A configuration in which a plurality of functions is sequentially switched through the operation of the switching lever 9, or a configuration that does not include the settings described in the above exemplary embodiment is also included in a scope of the present disclosure.

While a cross key serving as an instruction unit has been described in the above exemplary embodiment, the instruction unit is not limited thereto. For example, a unit indicating only two orientations or a stick-type unit that consecutively indicates all orientations can be used as the instruction unit.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-196421, filed Oct. 6, 2017, which is hereby incorporated by reference herein in its entirety.

What is claimed is:

1. An operation apparatus to be used with any of right and left hands of a user thereof, to be attached to any of two arm portions of a stand for the right and left hands, respectively, and to be connected to a lens apparatus to transmit a control signal to the lens apparatus for operating the lens apparatus, the operation apparatus comprising:
   an operation member configured to be rotated about a rotation axis for focus adjustment of the lens apparatus;
   a holder that holds the operation member; and
   a display held by the holder,
   wherein the holder includes an attachment portion for attachment of the operation apparatus to any of the two arm portions of the stand, an orientation of the display being changed due to which of the two arm portions the operation apparatus is attached to via the attachment portion,
   wherein the operation member, the display and the attachment portion are arranged in this order in a direction of the rotation axis, and
   wherein the display is configured to display information in such an orientation of the displayed information that the operation member is arranged upward relative to the display in the orientation of the displayed information, such that the displayed information is not upside down to the user whichever of the two arm portions the operation apparatus is attached to.

2. The operation apparatus according to claim 1, further comprising:
   a key arranged on the holder on a side opposite to the operation member with respect to the display in the direction of the rotation axis and configured to be operated to set a function of the operation apparatus; and
   a switch arranged on the holder closer to the operation member than the key and configured to cause a state of the function to be enabled or disabled.

3. The operation apparatus according to claim 2,
   wherein the holder includes a first surface parallel to the rotation axis and a second surface adjacent to the first surface in a circumference of the rotation axis, and
   wherein the key and the display are arranged on the first surface, and the switch is arranged on the second surface.

4. The operation apparatus according to claim 3,
   wherein the holder includes two of the second surface,
   wherein the switch is arranged on each of the two of the second surface, and
   wherein the switch on one of the two of the second surface is disabled and the switch on another of the two of the second surface is enabled.

5. The operation apparatus according to claim 3, wherein the first surface is surrounded by a wall.

6. The operation apparatus according to claim 5, wherein the wall is not in an area in a periphery of the key.

7. The operation apparatus according to claim 5, further comprising a cover that is attached to the wall.

8. A system comprising:
   a lens apparatus; and
   an operation apparatus to be used with any of right and left hands of a user thereof, to be attached to any of two arm portions of a stand for the right and left hands, respectively, and to be connected to the lens apparatus to transmit a control signal to the lens apparatus for operating the lens apparatus,
   wherein the operation apparatus includes:
   an operation member configured to be rotated about a rotation axis for focus adjustment of the lens apparatus;
   a holder that holds the operation member; and
   a display held by the holder,
   wherein the holder includes an attachment portion for attachment of the operation apparatus to any of the two arm portions of the stand, an orientation of the display being changed due to which of the two arm portions the operation apparatus is attached to via the attachment portion,
   wherein the operation member, the display and the attachment portion are arranged in this order in a direction of the rotation axis, and
   wherein the display is configured to display information in such an orientation of the displayed information that the operation member is arranged upward relative to the display in the orientation of the displayed information, such that the displayed information is not upside down to the user whichever of the two arm portions the operation apparatus is attached to.

9. An image pickup apparatus comprising:
   an image pickup element; and
   a system which forms an image on the image pickup element,
   the system including:
   a lens apparatus; and
   an operation apparatus to be used with any of right and left hands of a user thereof, to be attached to any of two arm portions of a stand for the right and left hands, respectively, and to be connected to a lens apparatus to transmit a control signal to the lens apparatus for operating the lens apparatus,
   wherein the operation apparatus includes:
   an operation member configured to be rotated about a rotation axis for focus adjustment of the lens apparatus;
   a holder that holds the operation member; and
   a display held by the holder,
   wherein the holder includes an attachment portion for attachment of the operation apparatus to any of the two arm portions of the stand, an orientation of the display being changed due to which of the two arm portions the operation apparatus is attached to via the attachment portion,
   wherein the operation member, the display and the attachment portion are arranged in this order in a direction of the rotation axis, and
   wherein the display is configured to display information in such an orientation of the displayed information that the operation member is arranged upward relative to the display in the orientation of the displayed information, such that the displayed information is not upside down to the user whichever of the two arm portions the operation apparatus is attached to.

* * * * *